UNITED STATES PATENT OFFICE.

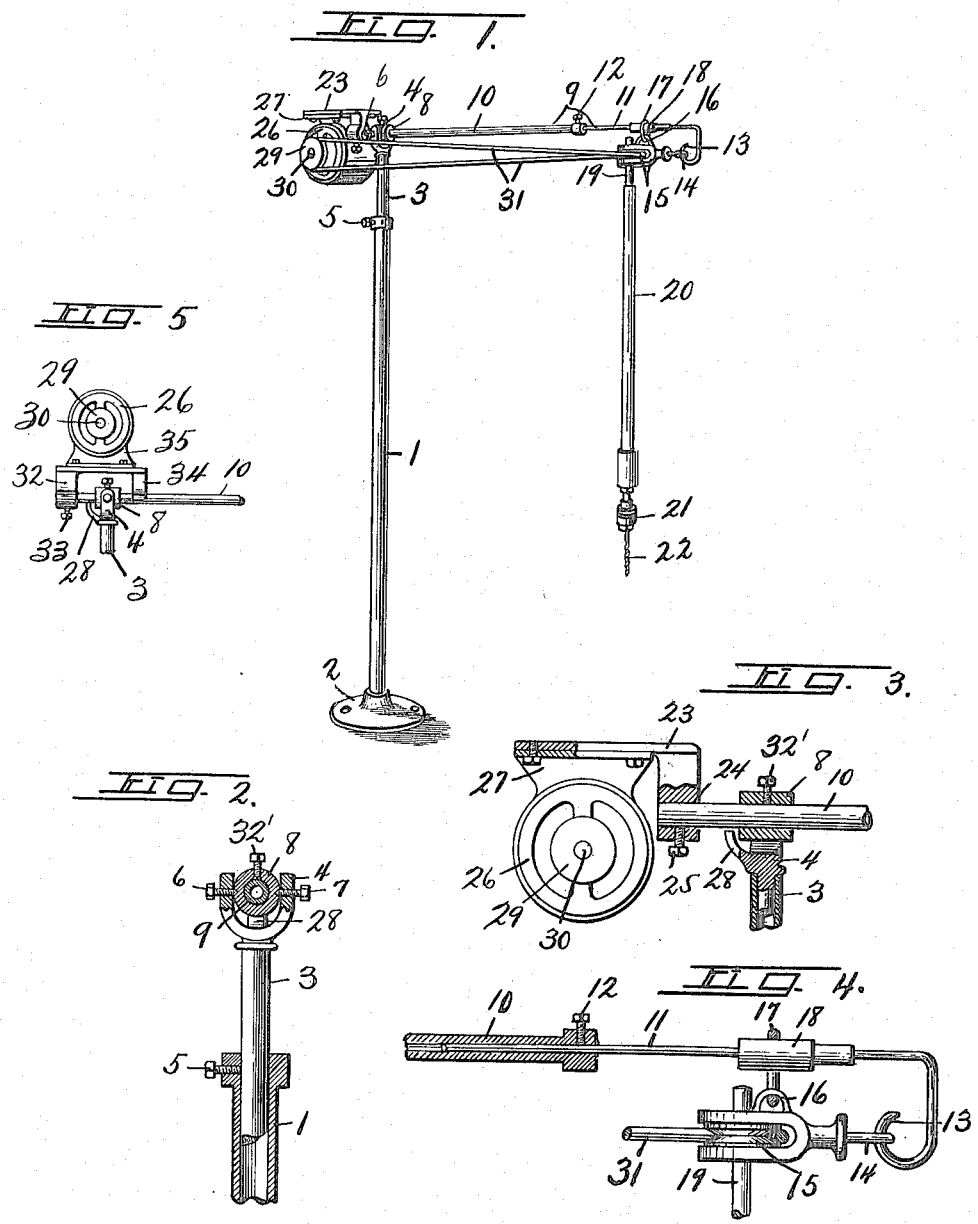

CLARENCE F. HOTCHKISS, OF BINGHAMTON, NEW YORK, ASSIGNOR TO STOW MANUFACTURING COMPANY, OF BINGHAMTON, NEW YORK, A CORPORATION OF NEW YORK.

BELT-GEARING.

1,143,583.  Specification of Letters Patent.  Patented June 15, 1915.

Application filed August 11, 1913. Serial No. 784,282.

*To all whom it may concern:*

Be it known that I, CLARENCE F. HOTCHKISS, of Binghamton, in the county of Broome, in the State of New York, have invented new and useful Improvements in Belt-Gearing, of which the following, taken in connection with the accompanying drawings, is a full, clear, and exact description.

This invention relates to certain improvements in belt gearing and pertains more particularly to a portable or semi-portable adjustable mounting for a flexible shaft for reaming, grinding, boring, etc.

The primary object of the invention is to produce a flexible shaft which shall be supported upon an upright portable standard vertically adjustable to vary the height of the shaft suspension and in such a manner that the shaft may be used in a complete circle about the supporting standard.

A further object is to utilize the driving motor as a balance or a partial balance for the flexible shaft and its supporting arm.

Another object is to provide means to adjust the supporting arm for the flexible shaft for the purpose of tightening the driving belt.

In the drawings,—Figure 1 is a perspective view of the machine. Fig. 2 is a view, partially in section, showing the means for adjusting the upright standard, and the means in connection with the standard for pivotally supporting the horizontal arm. Fig. 3 is a fragmentary view, partially in section, of the upright standard, the horizontal arm supported thereby and its motor attachment. Fig. 4 shows the adjustment of the horizontal arm. Fig. 5 is a view of a slightly varied form in which the motor is supported in such a manner that it partially balances itself.

The machine comprises an upright hollow portable standard formed of a hollow pipe-like member —1— having a flanged base —2—, and a telescoping metal rod —3—, hollow for at least a portion of its length to receive and support a fork-shaped member or yoke —4— upon its upper end.

The parts —1— and —3— may be held in any desired relative position by means of a set screw —5—. The opposite arms of the yoke —4— are provided with threaded openings to receive set screws —6— and —7— having conical shaped ends seated in opposite recesses in a sleeve —8— so that the sleeve is pivotally supported with respect to the yoke.

The sleeve —8— is provided with a bore of sufficient diameter to receive the arm —9— formed of two telescoping sections —10— and —11—, the section —10— passing through the sleeve —8— and having a portion projecting upon either side thereof.

The section —11— is angular in longitudinal cross section and preferably telescopes within the section —10— and may be held in any predetermined relative position by means of a set screw —12— and is provided on its projecting end with a hook-shaped portion —13— adapted to grasp the ring —14— of a pulley —15—. The pulley is in turn supported by the section —11— of the arm —9— through the medium of a loop —16—, preferably integral with the casing of the pulley —15— and a link —17— passed over and engaged with the arm —11— and linked through the loop —16—. For this purpose the arm —11— is provided with a sleeve —18— adapted to act as a bearing for the link —17—.

The wheel or rotating portion of the pulley —15— is formed with a concentric axle —19— adapted to be rotated by and with the wheel and to this axle is connected the flexible shaft —20—, its usual chuck —21— and the desired tool, as a drill, —22—, all as well known in the art.

The other end of the section —10— from that within which the section —11— telescopes projects, as above stated, some distance beyond the sleeve —8— and is adapted to support an angularly shaped bracket —23— having an opening —24— adapted to receive the end of the section —10— so that the parts are relatively slidable and may be adjusted with respect to each other and are held in any predetermined position of adjustment by means of set screws —25—.

A motor —26— is attached to and supported by the bracket —23— through the medium of an angular plate —27— having a connection with the motor case and in turn bolted to the bracket —23—.

The motor may and preferably does slightly overbalance the flexible shaft and to prevent the motor from moving downward beyond a predetermined point, the yoke —4— is provided with a projecting finger —28—, preferably integral with the yoke and so positioned that the arm —8— will contact therewith when the motor has moved the predetermined distance.

The motor may be of any well known form and may be suspended from the section —10— of the arm —9— in any suitable manner and I have shown the construction above described simply as illustrative of one means of supporting the motor or driving power in such a manner as to balance or partially balance the flexible shaft, the only condition being that the pulley —29— upon the motor shaft —30— be in such a position relative to the pulley —15— that the belt —31— may be passed over the respective pulleys without contacting with the standard or other supporting parts.

It will now be readily apparent that the flexible shaft and its supporting arm —9— are vertically adjustable by means of the telescoping sections —1— and —3— of the standard and that the yoke —4— is freely rotatable with respect to the section —3— so that the shaft may be used in a complete circle about the standard and at the desired height. It is further apparent that the sections —10— and —11— of the arm —9— are relatively adjustable to properly tension the belt —31— and that the arm —9— may be positioned at any desired point relative to the sleeve —8— to vary the distance of the motor —26— from the sleeve and, therefore, the balancing power of the motor. The bracket —23— may also be adjusted along the section —10— to vary the distance of the motor from the sleeve and in like manner its balancing power.

As above stated, the arm —9— is adjustable relatively to and through the sleeve —8— both in the operation of assembling the machine and for the purpose of future adjustment and the sleeve —8— is provided with a set screw —32'— adapted to hold the arm in any of its relative positions.

In Fig. 5, I have shown a slightly different form of the motor supporting means so constructed and arranged that the motor is partially supported upon each side of the pivot of the arm —10—, so that it partially balances itself and this is particularly advantageous when the motor is quite heavy and the flexible shaft light and its supporting arm short. The bracket —32— engages the arm —10— in the same manner as the bracket —23—, except that it extends in the opposite direction and over the pivot of the arm —10—. The bracket —32— is shown with a depending member —34— having a semi-circular journal adapted to seat itself upon the arm —10— and aid in supporting the bracket, but it is readily apparent that this member is a non-essential element and that the device is completely operable when it is absent. The bracket —23— is held in any desired position relative to the arm —10— by means of set screw —33—, similar to the set screw —25—. The motor —26— is adapted to rest upon the bracket —32— and may be connected thereto in any suitable manner, and for this purpose I have shown the plate —35— as attached to the motor and in turn bolted to the bracket. It is readily apparent that by adjusting the bracket along the shaft —10— or by adjusting the shaft —10—, itself, with respect to the sleeve —8— the balancing power of the motor may be varied at will.

What I claim is:

1. In a device of the class described, a support, an arm pivotally mounted thereon, a flexible shaft mounted upon one end of said arm, a motor mounted upon the other end of said arm and adjustable to balance the arm and flexible shaft, and a belt for transmitting power from the motor to the flexible shaft, said arm comprising longitudinally adjustable sections relatively movable to adjust the flexible shaft to properly tension said belt in any adjustment of the motor.

2. In a device of the class described, a support, an arm pivotally mounted thereon, a motor mounted on one end of said arm and adjustable along the arm, a flexible shaft mounted on the other end of said arm, means for transmitting the power from the motor to the flexible shaft, and means for adjusting the flexible shaft toward and from the pivot of the arm to tension the transmitting means.

3. In a device of the class described, a support, an arm pivotally mounted on said support, a flexible shaft mounted upon one end of the arm, a driving motor mounted upon the opposite end of the arm and adjustable along said arm to balance the arm and the flexible shaft, and means for transmitting motion from the motor to the flexible shaft.

4. In a device of the class described, a pivotally mounted arm, a shaft supported by said arm, a motor mounted on said arm and adjustable to balance itself and the shaft, and means for transmitting motion from the motor to the shaft.

5. In a supporting means for a flexible shaft, an arm having an end portion bent at an angle to the main portion, a pulley case, a pulley mounted therein, an eye in connection with said case and engaged with the bent end portion of said arm, a member loosely mounted on said arm and engaged with said pulley case to support the same, and a flexible shaft driven by said pulley.

In witness whereof I have hereunto set my hand this 1st day of August, 1913.

CLARENCE F. HOTCHKISS.

Witnesses:
 FRED W. KLAGES,
 J. D. BRUNNER, Jr.